(12) United States Patent
Schmitz et al.

(10) Patent No.: US 9,882,474 B2
(45) Date of Patent: Jan. 30, 2018

(54) MULTI-MODE CONTROLLED POWER CONVERTER

(71) Applicant: IDT EUROPE GMBH, Dresden (DE)

(72) Inventors: Richard Maria Schmitz, San Tan Valley, AZ (US); Eric Marschalkowski, Inning am Ammersee (DE); Chris Young, Round Rock, TX (US)

(73) Assignee: IDT EUROPE GMBH, Dresden (DE)

( * ) Notice: Subject to any disclaimer, the term of this patent is extended or adjusted under 35 U.S.C. 154(b) by 0 days.

(21) Appl. No.: 14/889,285

(22) PCT Filed: May 23, 2014

(86) PCT No.: PCT/EP2014/060664
§ 371 (c)(1),
(2) Date: Nov. 5, 2015

(87) PCT Pub. No.: WO2014/187956
PCT Pub. Date: Nov. 27, 2014

(65) Prior Publication Data
US 2016/0126836 A1    May 5, 2016

Related U.S. Application Data

(60) Provisional application No. 61/827,225, filed on May 24, 2013.

(51) Int. Cl.
*H02M 3/158* (2006.01)
*H02M 3/157* (2006.01)
*H02M 1/00* (2006.01)

(52) U.S. Cl.
CPC .... *H02M 3/157* (2013.01); *H02M 2001/0032* (2013.01); *H02M 2001/0035* (2013.01); *Y02B 70/16* (2013.01)

(58) Field of Classification Search
CPC ............ H02M 3/00; H02M 3/02; H02M 3/10; H02M 3/145; H02M 3/155; H02M 3/156;
(Continued)

(56) References Cited

U.S. PATENT DOCUMENTS 6,509,721 B1 * 1/2003 Liebler ................. H02M 3/158
                                                    323/224
7,834,606 B2 * 11/2010 Liu ....................... H02M 3/157
                                                    323/283
(Continued)

FOREIGN PATENT DOCUMENTS

TW        201027888 A       7/2010
TW        201125271 A       7/2011

OTHER PUBLICATIONS

J. Xiao et al. , "A 4-μA Quiescent-Current Dual-Mode Digitally Controlled Buck Converter IC for Cellular Phone Applications", IEEE Journal of Solid-state Circuits, vol. 39, No. 12, Dec. 2004, pp. 2342-2348.*

(Continued)

*Primary Examiner* — Timothy J Dole
*Assistant Examiner* — Carlos Rivera-Perez
(74) *Attorney, Agent, or Firm* — Heslin Rothenberg Farley & Mesiti P.C.

(57) ABSTRACT

A switched power converter includes a switchable power stage for generating an output voltage according to a switching signal and an input voltage via a switching element. The switching signal is generated by a multi-mode controller. The multi-mode controller controls a digital control path for generating a pulse width modulation switching signal and a constant-on-time control path for generating a constant-on-time switching signal. The switching signal for controlling the switching element is generated in the digital control path when the multi-mode controller is run in a high load mode. The switching signal is generated in the constant-on-time
(Continued)

control path when the multi-mode controller is run in a light load mode.

9 Claims, 1 Drawing Sheet

(58) Field of Classification Search
CPC .... H02M 3/157; H02M 3/158; H02M 3/1588; H02M 3/1563; H02M 2001/0008; H02M 2001/0009; H02M 2001/0025; H02M 2001/0032; H02M 2001/0035; H02M 1/14; H02M 1/32; H02M 2003/1566; Y02B 70/1466; Y02B 70/16
USPC ............... 323/222–226, 266, 271–277, 280, 323/282–288, 351; 363/21.04, 21.05, 363/21.12, 21.13, 41, 74, 123–127; 361/18
See application file for complete search history.

(56) References Cited

U.S. PATENT DOCUMENTS

| | | |
|---|---|---|
| 2005/0116697 A1 | 6/2005 | Matsuo et al. |
| 2010/0164455 A1 | 7/2010 | Li et al. |
| 2012/0032661 A1 | 2/2012 | Nakamura |
| 2016/0118881 A1* | 4/2016 | Schmitz ............... H02M 3/156 323/271 |
| 2016/0261183 A1* | 9/2016 | Kelly ................... H02M 3/157 |

OTHER PUBLICATIONS

International Search Report for PCT/EP2014/060664 dated Aug. 19, 2014.

* cited by examiner

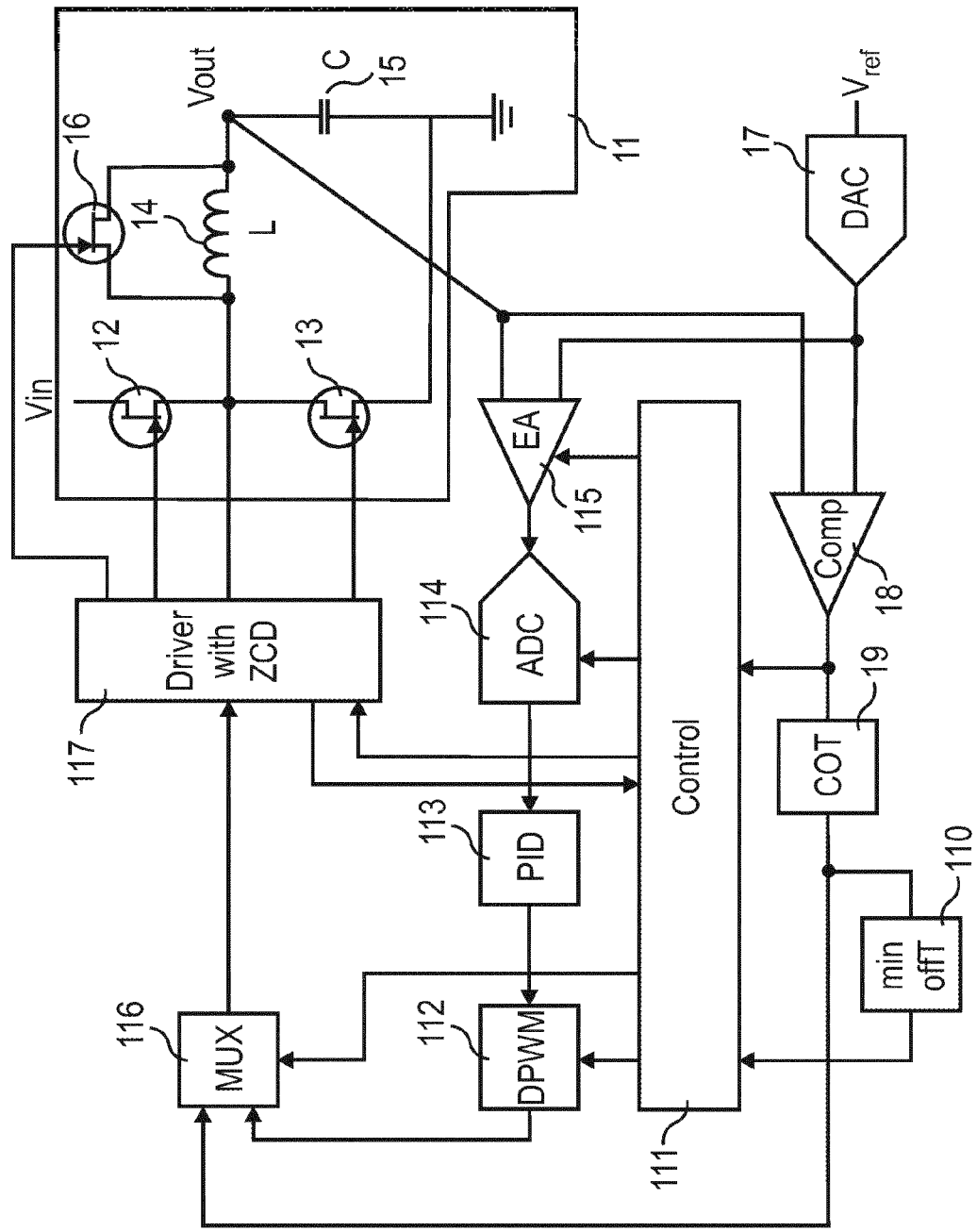

MULTI-MODE CONTROLLED POWER CONVERTER

CROSS REFERENCE TO RELATED APPLICATIONS

This application is a national stage filing under section 371 of International Application No. PCT/EP2014/060664, filed on May 23, 2014, and published in English on Nov. 27, 2014, as WO 2014/187956 A1, which claims priority of U.S. Provisional Application No. 61/827,225 filed on May 24, 2013, the entire content of said applications being hereby incorporated herein by reference.

FIELD OF THE INVENTION

The present disclosure relates to a switched power converter controlled by a multi-mode controller and a related method.

BACKGROUND OF THE INVENTION

Switched DC-DC converters comprise a switchable power stage, wherein an output voltage is generated according to a switching signal and an input voltage. The switching signal is generated in a digital control circuit that adjusts the output voltage to a reference voltage. The switched power stage comprises a dual switch consisting of a high-side field effect transistor (FET) and a low-side FET, an inductance and a capacitor. During a charge phase, the high-side FET is turned on and the low-side FET is turned off by the switching signal to charge the capacitor. During a discharge phase the high-side FET is turned off and the low-side FET is turned on to match the average inductor current to the load current. The switching signal is generated as digital pulse width modulation signal with a duty cycle determined by a control law. The control law may be implemented by a PID compensator.

A digital control circuit for DC-DC converters is very well suited for high performance applications that require a good load transient behavior. Nonetheless, if the powered application runs in light load the digital control circuit has the disadvantage of consuming too much current and therefore the efficiency of the DCDC converter is negatively influenced. This results in poor light load efficiency. Because many applications run most of their time in light load conditions, this negatively affects the overall energy consumption. Therefore it is highly desirable to have better efficiency under light load conditions.

BRIEF SUMMARY OF THE INVENTION

The present disclosure relates to switched power converter comprising a switchable power stage for generating an output voltage according to a switching signal and an input voltage by means of a switching element. The switching signal is generated either by a digital control path when a high load present or by a constant-on-time control path when a light load present. A multi-mode controller is provided for toggling between a high load mode and light load mode according to load current or output voltage. When the multi-mode controller operates in light load mode the switching signal generated by the constant-on-time control path is provided to the switching element of the power stage. When the multi-mode controller operates in high load mode, a pulse width modulation switching signal generated from the digital circuit is provided to the switching element of the power stage.

When the multi-mode controller operates in light load mode the digital control path may be switched off. This saves power.

The multi-mode controller may be configured to determine executing the light load mode or the high load mode from a measured load current or by monitoring the output voltage.

The present invention further relates to a method for controlling a switched power converter comprising a switchable power stage switched according to a switching signal. The method comprises generating a pulse width modulation switching signal in a digital control path when running the switched power converter in a high load mode; and generating a constant-on-time switching signal in a constant-on-time control path when running the switched power converter in a light load mode.

The digital control path may be activated when the sum of the constant on-time and a minimum off-time determined in the constant-on-time control path is not greater than the normal period of the digital pulse width modulation signal determined in the digital control path.

BRIEF DESCRIPTION OF THE DRAWINGS

Reference will be made to the accompanying drawing, wherein

FIG. 1 shows a block diagram of DC-DC converter controlled by multi-mode compensator having a light load mode and a high load mode.

DETAILED DESCRIPTION OF THE INVENTION

FIG. 1 shows a power converter comprising a switchable power stage 11. The switchable power stage 11 comprises a first switching element 12 and a second switching element 13, an inductance 14 and a capacitor 15. The switching elements 12 and 13 are driven by a driver 117 with zero current detection. The driver 117 forwards a switching signal generated either in a digital control path or in a constant-on-time control path. The digital control path comprises an error amplifier 115, an ADC 114 a PID compensator 113 and a digital pulse width modulator 112. The constant-on-time control path comprises a comparator 18 and a constant-on-time circuit 19 and a minimum off-time circuit 110. A multi-mode controller 111 is provided for toggling between a light load mode in which the constant-on-time control path is activated and a high load mode in which the digital control path is activated. The mode is determined from the load current or by monitoring the output voltage. For this purpose the output voltage is compared to a reference voltage by the comparator 18 and the result is provided to the multi-mode controller 111.

The reference voltage may be provided digitally and is converted to the analogue domain by DAC 17.

The digital control path activated when a high load is present and generates a digital pulse width modulation switching signal. The error amplifier 115 amplifies a difference between the output voltage and a reference voltage for generating an error signal. The error signal is converted into the digital domain by ADC 114. The PID compensator 113 processes the digitized error signal for calculating a pulse width modulation duty cycle which is provided to the digital pulse width modulator 112 that outputs the digital pulse width modulation switching signal.

The error amplifier 115, the ADC 114, the PID compensator 113 and the digital pulse width modulator 112 are adjusted with respect to bandwidth by the multi-mode controller 111.

The constant-on-time control path generates the constant-on-time switching signal in case a light load is present. The minimum off-time circuit 110 guarantees that the sum of the constant-on time and the minimum off time is greater than a normal period of the digital pulse width modulation signal generated in the digital control path. In case the multi-mode controller 111 detects that this condition is not met, the digital control path is activated.

A multiplexer 115 is provided for multiplexing the switching signal between the constant-on-time switching signal and the pulse width modulation switching signal. The multiplexer 115 is controlled by the multi-mode controller 110.

The power switchable power stage 11 comprises a third switching element 16 for short-circuiting the inductance 14 for draining an excessive current to minimize overshoot of the output voltage.

The invention claimed is:

1. A switched power converter comprising a switchable power stage for generating an output voltage according to a switching signal and an input voltage via a switching element, the switching signal being generated by a multi-mode controller, said multi-mode controller controlling a digital control path for generating a pulse width modulation switching signal and a constant-on-time control path for generating a constant-on-time switching signal, wherein the switching signal for controlling the switching element is generated in the digital control path when the multi-mode controller is run in a high load mode and wherein the switching signal is generated in the constant-on-time control path when the multi-mode controller is run in a light load mode, and wherein the digital control path is disconnected from power supply when the multi-mode controller is run in light load mode, wherein the constant-on-time control path further comprises a minimum-off-time circuit configured to compute a sum of constant-on-time and a minimum-off-time, and wherein the multimode controller is configured to activate the digital control path when the sum of the constant-on-time and the minimum-off-time is not greater than a normal period of the pulse width modulation switching signal.

2. The switched power converter according to claim 1, wherein the multi-mode controller is configured to determine executing the light load mode or the high load mode from a load current or by monitoring the output voltage.

3. The switched power converter according to claim 1, wherein the digital control path comprises an error amplifier for amplifying a difference between the output voltage and a reference voltage for generating an error signal; an analog to digital converter to convert the error signal into a digitized error signal; a PID compensator to generate a pulse width modulation duty cycle according to the digitized error signal; and digital pulse width modulator for generating the pulse width modulation switching signal.

4. The switched power converter according to claim 3, wherein the error amplifier, the analog to digital converter, the PID compensator and the digital pulse width modulator are adjustable with respect to bandwidth by the multi-mode controller.

5. The switched power converter according to claim 1, further comprising a multiplexer for multiplexing the switching signal between the constant-on-time switching signal and the pulse width modulation switching signal, said multiplexer controlled by the multi-mode controller.

6. The switched power converter according to claim 1, wherein the constant-on-time path comprises a comparator and a constant-on-time circuit, wherein the comparator is configured to compare the output voltage with a reference voltage and wherein the comparator is connected to the multi-mode controller and the constant-on-time circuit.

7. The switched power converter according to claim 1, wherein the switchable power stage comprises a third switching element to short-circuit an inductor for draining an excessive inductor current.

8. The switched power converter according to claim 1, further comprising a driver with zero current detection to drive the switching element according to the switching signal.

9. A method for controlling a switched power converter comprising a switchable power stage switched according to a switching signal, the method comprising:
generating a pulse width modulation switching signal in a digital control path when running the switched power converter in a high load mode;
disconnecting the digital control path from a power supply, and generating a constant-on-time switching signal in a constant-on-time control path when running the switched power converter in a light load mode;
computing a sum of constant-on-time and a minimum-off-time with a minimum-off time circuit in the constant-on-time control path; and
activating the digital control path when the sum of the constant on-time and the minimum off-time determined in the constant-on-time control path is not greater than a normal period of the pulse width modulation switching signal.

* * * * *